(12) United States Patent
Lim et al.

(10) Patent No.: US 12,407,289 B2
(45) Date of Patent: Sep. 2, 2025

(54) INVERTER DRIVING DEVICE AND METHOD OF CONTROLLING SAME

(71) Applicants: Hyundai Motor Company, Seoul (KR); Kia Corporation, Seoul (KR)

(72) Inventors: Hyun Jae Lim, Hwaseong-si (KR); Joo Young Park, Yongin-si (KR); Young Kwan Ko, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 232 days.

(21) Appl. No.: 18/369,317

(22) Filed: Sep. 18, 2023

(65) Prior Publication Data

US 2024/0305219 A1 Sep. 12, 2024

(30) Foreign Application Priority Data

Mar. 6, 2023 (KR) .................. 10-2023-0029367

(51) Int. Cl.
*H02P 27/08* (2006.01)
*H02M 7/5395* (2006.01)

(52) U.S. Cl.
CPC .......... *H02P 27/08* (2013.01); *H02M 7/5395* (2013.01)

(58) Field of Classification Search
CPC ...... H02P 27/08; H02P 27/12; H02P 2209/11; H02P 21/05; H02P 27/00; H02P 27/06; H02P 27/04; H02P 29/50; H02P 29/032; H02P 2101/45; H02P 2201/13; H02P 2207/05; H02P 2209/09; H02P 25/03; H02P 25/062; H02P 25/064; H02P 23/07; H02P 21/22; H02P 21/14; H02P 6/10; H02P 1/423; H02P 1/46; H02P 1/26; H02M 7/5395; H02M 1/385; H02M 7/5387; H02M 1/08; H02M 7/537
See application file for complete search history.

(56) References Cited

U.S. PATENT DOCUMENTS

2016/0322890 A1* 11/2016 Lee .................. H02P 27/06

FOREIGN PATENT DOCUMENTS

| JP | 2020-174416 | A | 10/2020 |
| JP | 6867931 | B2 | 5/2021 |
| KR | 10-2022-0138187 | A | 10/2022 |
| KR | 10-2024-0037674 | A | 3/2024 |

* cited by examiner

*Primary Examiner* — Antony M Paul
(74) *Attorney, Agent, or Firm* — Morgan, Lewis & Bockius LLP

(57) ABSTRACT

An inverter driving device includes an inverter including a plurality of legs corresponding to a plurality of phases, and a controller that generates a plurality of pole voltage commands from a plurality of space vector modulation signals corresponding to the plurality of phases and modulates the pole voltage commands through pulse width modulation to control a turn-on state of switches included in the legs, wherein the controller is configured to generate a plurality of discontinuous modulation signals by applying an offset voltage for discontinuous modulation to the plurality of space vector modulation signals if at least one of a maximum voltage and a minimum voltage of the space vector modulation signals is not included in a predetermined linearity range, adjusts at least one of a maximum voltage and a minimum voltage of the discontinuous modulation signals, and outputs the adjusted discontinuous modulation signals as the pole voltage commands.

17 Claims, 11 Drawing Sheets

FIG. 6

| Vmax3_ref | Vmax2_ref + Vdt_comp |
|---|---|
| Vmid3_ref | Vmid2_ref - Vdt_comp |
| Vmin3_ref | Vmin2_ref + Vdt_comp |

INVERTER DRIVING DEVICE AND METHOD OF CONTROLLING SAME

CROSS-REFERENCE TO RELATED APPLICATION

The present application claims priority to Korean Patent Application No. 10-2023-0029367, filed on Mar. 6, 2023, the entire contents of which is incorporated herein for all purposes by this reference.

BACKGROUND OF THE PRESENT DISCLOSURE

Field of the Present Disclosure

The present disclosure relates to an inverter driving device and a method of controlling the same for improving linearity between a voltage command for an inverter and an output voltage of the inverter.

Description of Related Art

An inverter is a component that converts a DC voltage of a high-voltage battery into an AC voltage to drive a motor. A method of driving a switch inside an inverter includes pulse width modulation (PWM).

PWM include space vector pulse width modulation (SVPWM) and discontinuous pulse width modulation (DPWM). Here, SPWM is a continuous modulation method of modulating one voltage command represented in a complex number space into an effective voltage vector and a zero voltage vector by use of the voltage command as a reference space vector, and unlike sinusoidal pulse width modulation (SPWM) that individually modulates three-phase voltage commands. DPWM is a discontinuous modulation method that modulates only two-phase voltage commands.

Meanwhile, the pulse width of a pulse width modulation signal may be limited by minimum pulse width (MPW) conditions. The MPW conditions are conditions for a minimum pulse width for maintaining a switch included in an inverter in a turn-on state and a turn-off state for a predetermined time period within one duty cycle.

If the pulse width of a pulse width modulation signal does not satisfy the MPW conditions, a voltage command for an inverter and an output voltage of the inverter may be in a non-linear region. In the instant case, there are problems of occurrence of distortion of a phase voltage output from the inverter and increase in noise generated at the time of driving a motor.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY DISCLOSURE

Various aspects of the present disclosure are directed to improve linearity between a voltage command for an inverter and an output voltage of the inverter.

The technical issues to be achieved in an exemplary embodiment of the present disclosure are not limited to the technical issues mentioned above, and other technical issues which are not mentioned will be clearly understood by those of ordinary skill in the art to which the present disclosure belongs from the description below.

In accordance with an aspect of the present disclosure, the above and other objects may be accomplished by the provision of an inverter driving device including an inverter including a plurality of legs corresponding to a plurality of phases, and a controller configured to generate a plurality of pole voltage commands from a plurality of space vector modulation signals corresponding to each of the phases and to modulate the plurality of pole voltage commands through pulse width modulation to control a turn-on state of switches included in the plurality of legs, wherein the controller is configured to generate a plurality of discontinuous modulation signals by applying an offset voltage for discontinuous modulation to each of the space vector modulation signals if at least one of a maximum voltage and a minimum voltage of the plurality of space vector modulation signals is not included in a predetermined linearity range, adjusts at least one of a maximum voltage and a minimum voltage of the plurality of discontinuous modulation signals, and outputs the adjusted discontinuous modulation signals as the plurality of pole voltage commands.

In accordance with another aspect of the present disclosure, there is provided a method of controlling an inverter driving device, including generating a plurality of pole voltage commands from a plurality of space vector modulation signals corresponding to each of the phases, and modulating the plurality of pole voltage commands through pulse width modulation to control a turn-on state of switches included in an inverter, wherein the generating of the plurality of pole voltage commands includes generating a plurality of discontinuous modulation signals by applying an offset voltage for discontinuous modulation to each of the space vector modulation signals if at least one of a maximum voltage and a minimum voltage of the plurality of space vector modulation signals is not included in a predetermined linearity range, and adjusting at least one of a maximum voltage and a minimum voltage of the plurality of discontinuous modulation signals and outputting the adjusted discontinuous modulation signals as the plurality of pole voltage commands.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 6 is a table for describing a compensation voltage according to a dead time in an exemplary embodiment of the present disclosure;

Figure 1:
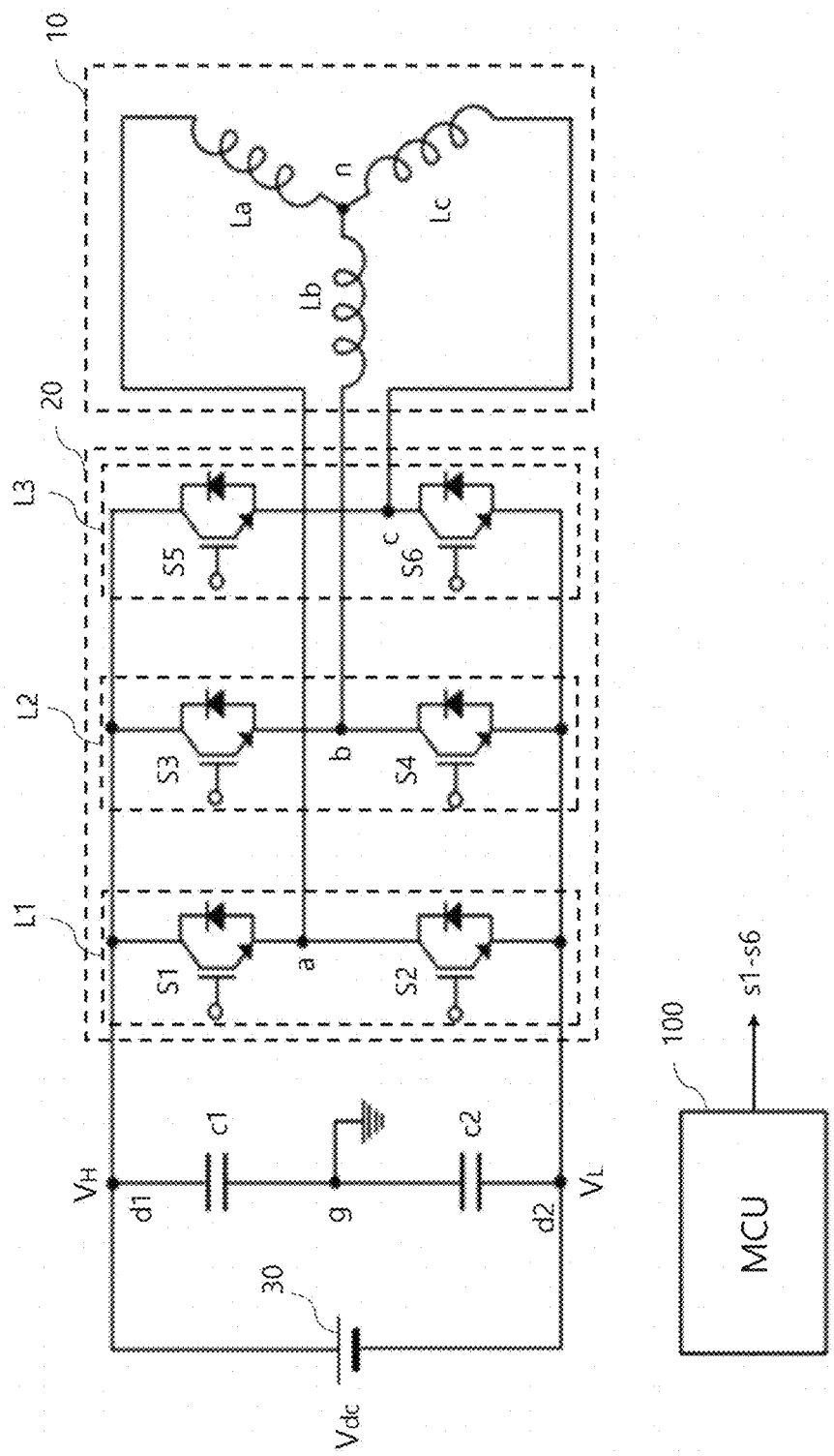
FIG. 1 is a diagram showing an example of a configuration of an inverter driving device in a motor driving system according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present specification will be described in detail with reference to the accompanying drawings, but the same or similar components are denoted by the same reference numerals and redundant descriptions thereof will be omitted. The suffixes "module" and "part" of elements herein are used for convenience of description and thus may be used interchangeably and do not have any distinguishable meanings or functions. In the following description of the exemplary embodiments included in the present specification, a detailed description of known functions and configurations incorporated herein will be omitted when it may obscure the subject matter of the present disclosure. Furthermore, the accompanying drawings are provided only for ease of understanding of the exemplary embodiments included in the present specification, do not limit the technical spirit included herein, and include all changes, equivalents and substitutes included in the spirit and scope of the present disclosure.

The terms "first" and/or "second" are used to describe various components, but such components are not limited by these terms. The terms are used to discriminate one component from another component.

When a component is "coupled" or "connected" to another component, it should be understood that a third component may be present between the two components although the component may be directly coupled or connected to the other component. When a component is "directly coupled" or "directly connected" to another component, it should be understood that no element is present between the two components.

An element described in the singular form is directed to include a plurality of elements unless the context clearly indicates otherwise.

In the present specification, it will be further understood that the term "comprise" or "include" specifies the presence of a stated feature, figure, step, operation, component, part or combination thereof, but does not preclude the presence or addition of one or more other features, figures, steps, operations, components, or combinations thereof.

Furthermore, a unit or a control unit included in the names of a motor control unit (MCU), a hybrid control unit (HCU), and the like is only a term widely used to name a controller that is configured to control a specific vehicle function and does not mean a generic functional unit. For example, each controller may include a communication device that communicates with other controllers or sensors to control functions of the controller, a memory that stores an operating system or logic commands and input/output information, and one or more processors that perform determination, operation, and decision necessary to control the functions.

FIG. 1 is a diagram showing an example of a configuration of an inverter driving device in a motor driving system according to an exemplary embodiment of the present disclosure. As shown in FIG. 1, the motor driving system may include a motor 10, an inverter 20, a battery 30, and a motor controller 100.

The motor 10 may include a plurality of windings La, Lb, and Lc corresponding to a plurality of phases. Ends of the plurality of windings La, Lb, and Lc on one side may be shortcircuited to form a neutral point n, and the other ends of the plurality of windings La, Lb, and Lc may be connected to AC links a, b, and c of the inverter 20.

The inverter 20 may include a plurality of legs L1, L2, and L3 corresponding to the plurality of phases. The plurality of legs L1, L2, and L3 may include switches S1 and S2, switches S3 and S4, and switches S5 and S6, respectively. The plurality of legs L1, L2, and L3 may be connected to DC links d1 and d2 to receive a DC voltage Vdc from the battery 30, transform the DC voltage Vdc into AC voltages corresponding to the plurality of phases, and provide the same to the AC links a, b, and c to drive the motor 10.

A capacitor c1 may be connected between a ground terminal g and the first DC link d1, and a capacitor c2 may be connected between the ground terminal g and the second DC link d2. The first DC link d1 may include a voltage of VH(Vdc/2), and the second DC link d2 may include a voltage of VL(−Vdc/2).

The motor controller 100 may be configured to determine phase voltage commands for the inverter 20 based on a torque required for the motor 10, and then determine pole voltage commands for the inverter 20 from the phase voltage commands based on symmetric space vector modulation (SVM). Here, phase voltages correspond to the potential differences between the neutral point n and the AC links a, b, and c, and pole voltages correspond to the potential differences between the ground terminal g and the AC links a, b, and c.

The motor controller 100 may modulate the pole voltage commands using pulse width modulation (PWM) to generate pulse width modulation signals, and then limit the pulse widths of the pulse width modulation signals based on minimum pulse width (hereinafter referred to as MPW) conditions and output the pulse width modulation signals as switching signals s1, s2, s3, s4, s5 and s6. The motor controller 100 may drive the inverter 20 by controlling the turn-on state of the switches S1, S2, S3, S4, S5 and S6 included in the plurality of legs L1, L2, and L3 based on the switching signals s1, s2, s3, s4, s5 and s6.

The MPW conditions are conditions for a minimum pulse width of the switching signals s1, s2, s3, s4, s5 and s6 for allowing the switches S1, S2, S3, S4, S5 and S6 to be maintained in a turn-on state and a turn-off state for a predetermined time period within one duty cycle so that the motor controller 100 detects a shortcircuit state between the motor 10 and the inverter 20.

If the pulse width of the pulse width modulation signal does not satisfy the MPW conditions, the motor controller 100 limits the pulse width of the pulse width modulation signal and outputs the same as the switching signals s1, s2, s3, s4, s5 and s6, and thus the pole voltage commands for the inverter 20 and the output voltage of the inverter 20 can have non-linearity. This will be described with reference to FIG. 2.

Figure 2:
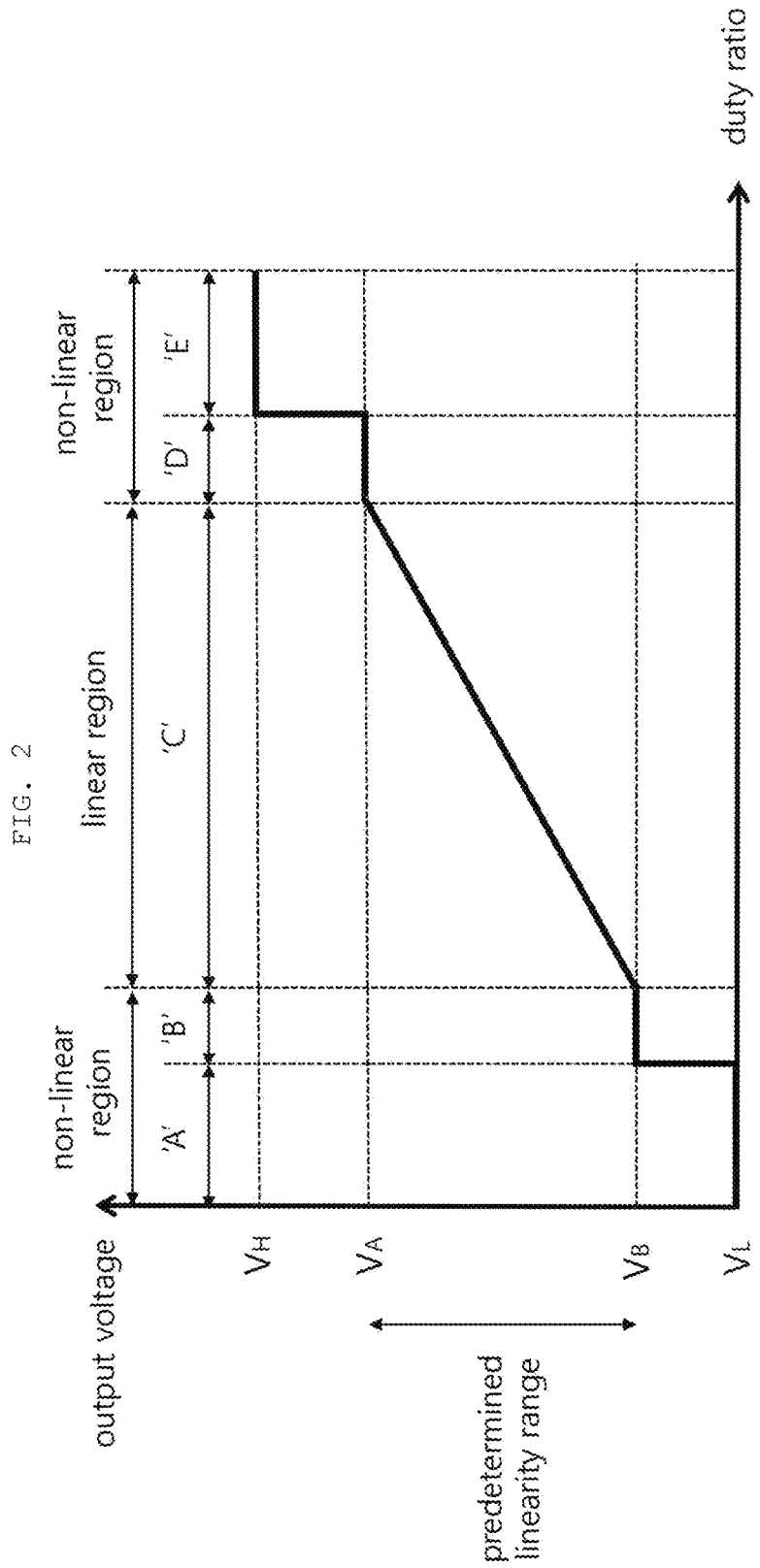
FIG. 2 is a graph for describing a relationship between a duty ratio of a pulse width modulation signal according to a pole voltage command and an output voltage of an inverter in an exemplary embodiment of the present disclosure.

FIG. 2 is a graph for describing a relationship between a duty ratio of a pulse width modulation signal according to a pole voltage command and an output voltage of an inverter.

Referring to FIG. 2, "C" corresponds to a case where a pole voltage command for the inverter is included in a preset linearity range (between VA and VB). Because "C" corresponds to a case where the pulse width of the pulse width modulation signal satisfies the MPW conditions, the duty ratio of the pulse width modulation signal and the output voltage of the inverter according to the pole voltage command may be in a linear region.

In case of "A" and "B" where the pole voltage command for the inverter is lower than the predetermined linearity range, the duty ratio of the pulse width modulation signal and the output voltage of the inverter may be in a non-linear region. "A" and "B" correspond to cases where the pulse width of the pulse width modulation signal does not satisfy the MPW conditions for maintaining the turn-on state of the switches included in the inverter for a predetermined time period. For example, "A" corresponds to a case where the pulse width of the pulse width modulation signal according to the pole voltage command is equal to or less than half the MPW, and "B" corresponds to a case where the pulse width of the pulse width modulation signal exceeds half the MPW but is equal to or less than the MPW. In case "A," the motor controller 100 may eliminate the pulse width of the pulse width modulation signal and output the same as a switching signal. At the instant time, the output voltage of the inverter may be output as VL. In case "B," the motor controller 100 may adjust the pulse width of the pulse width modulation signal to the MPW and output the same as a switching signal. At the instant time, the output voltage of the inverter may be output as VB.

Similarly, in case of "D" and "E" where the pole voltage command for the inverter is higher than the preset linearity range, the duty ratio of the pulse width modulation signal and the output voltage of the inverter may be in a non-linear region. "D" and "E" correspond to cases where the pulse width of the pulse width modulation signal does not satisfy the MPW conditions for maintaining the turn-off state of the switches included in the inverter for a predetermined time period.

As described above, when the pulse width of the pulse width modulation signal does not satisfy the MPW conditions, the pole voltage command for the inverter and the output voltage of the inverter may be in a non-linear region. In the instant case, there are problems of occurrence of distortion of the phase voltage output from the inverter and increase in noise generated at the time of driving the motor.

Accordingly, the exemplary embodiment proposes an inverter driving device configured for improving linearity between a pole voltage command for an inverter and an output voltage of the inverter by applying an offset voltage for discontinuous modulation to the pole voltage command in a non-linear region. A structure therefor is shown in FIG. 3.

Figure 3:
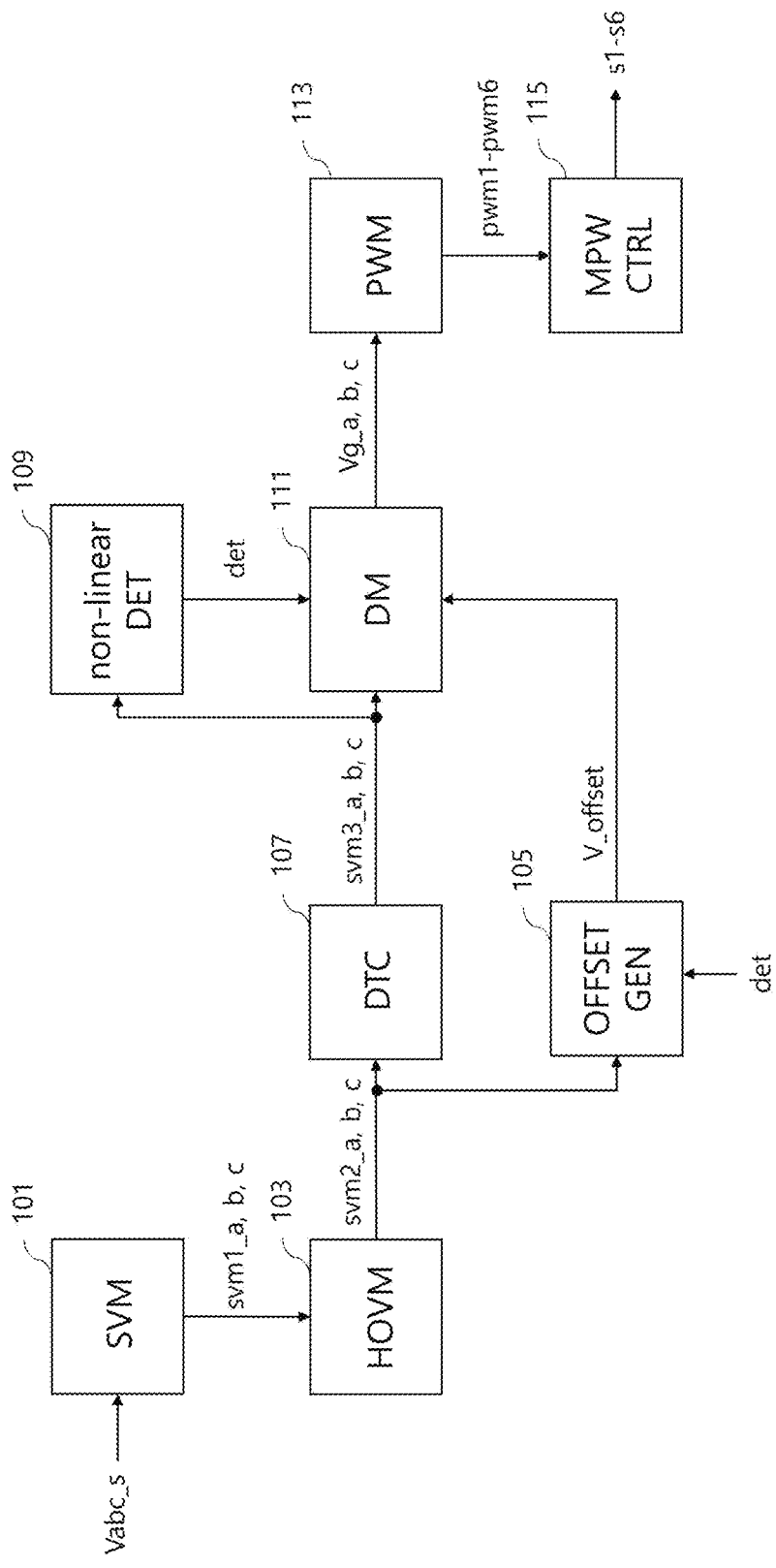
FIG. 3 is a block diagram showing an example of a configuration of a motor controller according to an exemplary embodiment of the present disclosure.

FIG. 3 is a block diagram showing an example of a configuration of the motor controller 100 according to an exemplary embodiment of the present disclosure. As shown in FIG. 3, the motor controller 100 may include a space vector modulator (SVM) 101, an overmodulation controller (HOVM) 103, an offset generator (OFFSET GEN) 105, a dead time compensator (DTC) 107, a non-linear range detector (non-linear DET) 109, a discontinuous modulator (DM) 111, a pulse width modulator (PWM) 113, and an MPW controller (MPW CTRL) 115.

The motor controller 100 may be configured to generate space vector modulation signals svm3_a, b, and c by sequentially performing space vector modulation control, overmodulation control, and compensation of output voltage error of the inverter by a dead time on a phase voltage command Vabc_s. Thereafter, the motor controller 100 may be configured to determine whether the space vector modulation signals svm3_a, b, and c are within a non-linear region based on the space vector modulation signals svm3_a, b, and c, determine whether to apply an offset voltage V_offset for discontinuous modulation according to the determination result, and generate pole voltage commands Vg_a, b, and c. Finally, the motor controller 100 may modulate the pole voltage commands Vg_a, b, and c using pulse width modulation (PWM) to generate pulse width modulation signals pwm1 to pwm6, and limit the pulse widths of the pulse width modulation signals pwm1 to pwm6 according to the MPW conditions to output the same as switching signals s1, s2, s3, s4, s5 and s6.

Accordingly, the motor controller 100 may output the switching signals s1, s2, s3, s4, s5 and s6 modulated by space vector pulse width modulation when the space vector modulation signals are determined to be within a linear region, and output the switching signals s1, s2, s3, s4, s5 and s6 modulated by discontinuous pulse width modulation when the space vector modulation signals are determined to be within a non-linear region.

Hereinafter, each component included in the motor controller 100 will be described.

The space vector modulator 101 may be configured to generate the first space vector modulation signals svm1_a, b, and c through symmetric space vector modulation using the phase voltage command Vabc_s as a reference space vector. Space vector modulation is a technique of modulating one reference space vector represented in a complex number space into an effective voltage vector and a zero voltage vector, and symmetric space vector modulation is a space vector modulation method of symmetrically disposing an effective voltage vector and a zero voltage vector within one sampling period.

Figure 4:
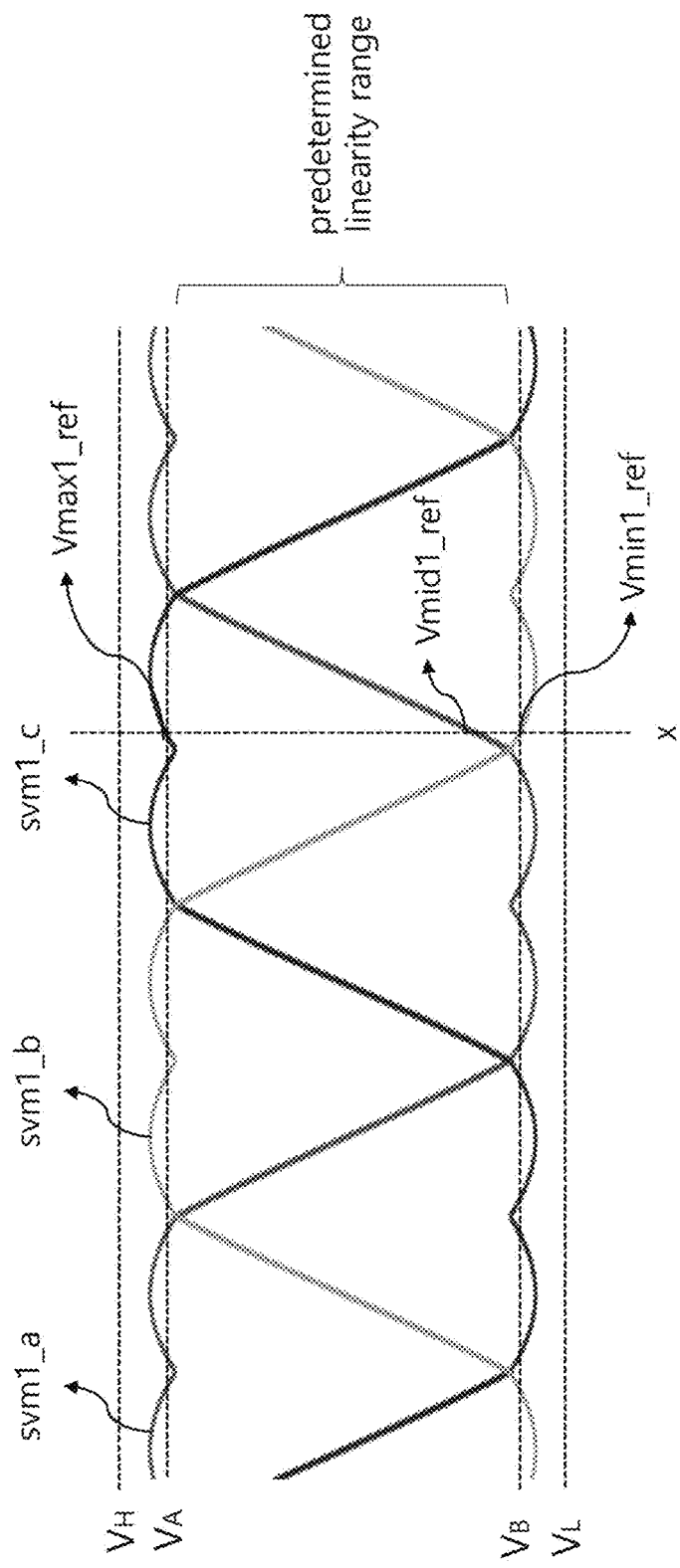
FIG. 4 is a waveform diagram of a space vector modulation signal obtained by modulating a phase voltage command using a symmetric space vector modulation method according to an exemplary embodiment of the present disclosure.

FIG. 4 shows waveforms of the first space vector modulation signals svm1_a, b, and c. At a predetermined point in time "x," the voltages of the first space vector modulation signals svm1_a, b, and c may be represented as a maximum voltage Vmax1_ref, a mid-voltage Vmid1_ref, and a minimum voltage Vmin1_ref depending on voltage levels. In FIG. 4, since a section in which the maximum voltage Vmax1_ref is equal to or greater than an upper limit voltage VA of a preset linearity range or the minimum voltage Vmin1_ref is equal to or less than a lower limit voltage VB of the preset linearity range corresponds to a non-linear region, when the first space vector modulation signals svm1_a, b, and c are directly modulated using pulse width modulation (PWM), phase voltages output from the inverter are distorted.

Referring back to FIG. 3, the overmodulation controller 103 may be configured to determine whether overmodulation control is required based on the first space vector modulation signals svm1_a, b, and c. Upon determining that overmodulation control is required, the overmodulation controller 103 may modify the waveforms of the first space vector modulation signals svm1_a, b, and c and output the same as second space vector modulation signals svm2_a, b, and c. On the other hand, upon determining that overmodulation control is not required, the overmodulation controller 103 may output the first space vector modulation signals svm1_a, b, and c as the second space vector modulation signals svm2_a, b, and c without modifying the waveforms of the first space vector modulation signals svm1_a, b, and c.

The offset generator 105 may be configured to generate the offset voltage V_offset for discontinuous modulation based on the second space vector modulation signals svm2_a, b, and c. Discontinuous modulation is a technique of applying an offset voltage V_offset to input waves so that transition of a switching state of a switch included in an inverter does not occur during a predetermined time period including a point in time when the input waves include a maximum voltage or a minimum voltage.

The fact that transition of a switching state does not occur during a predetermined time period means that the switching state is maintained in a turn-on state or turn-off state during the predetermined period. That is, the offset generator 105 may set the level of the offset voltage V_offset to a difference between the voltage VH of the first DC link (d1 in FIG. 1) and a maximum voltage of the plurality of second space vector modulation signals svm2_a, b, and c or to a difference between the voltage VL of a second DC link (d2 in FIG. 1) and a minimum voltage of the plurality of second space vector modulation signals svm2_a, b, and c.

The offset generator 105 may be configured to determine a maximum voltage and/or a minimum voltage of the second space vector modulation signals svm2_a, b, and c, which are parameters for setting the offset voltage V_offset, based on the second space vector modulation signals svm2_a, b, and c. Thereafter, the offset generator 105 may set, as the offset voltage V_offset, a difference between the voltage VH of the first DC link (d1 in FIG. 1) and the maximum voltage of the second space vector modulation signals svm2_a, b, and c and/or a difference between the voltage VL of a second DC link (d2 in FIG. 1) and the minimum voltage of the second space vector modulation signals svm2_a, b, and c if a detection signal det is activated in a non-linear region.

Meanwhile, if a switching state is maintained for a predetermined time period in discontinuous modulation, a dead time which will be described later is not applied during the predetermined period. Therefore, it is desirable that the offset generator 105 generate the offset voltage V_offset based on the second space vector modulation signals svm2_a, b, and c to which output voltage compensation by a dead time is not applied.

The dead time compensator 107 may apply a compensation voltage according to a dead time to the second space vector modulation signals svm2_a, b, and c to output the second space vector modulation signals svm2_a, b, and c as third space vector modulation signals svm3_a, b, and c.

The dead time refers to a minimum time during which turn-off states of switches need to be maintained to prevent switches that are switched in a complementary manner from being simultaneously turned on due to a switching delay.

Figure 5:
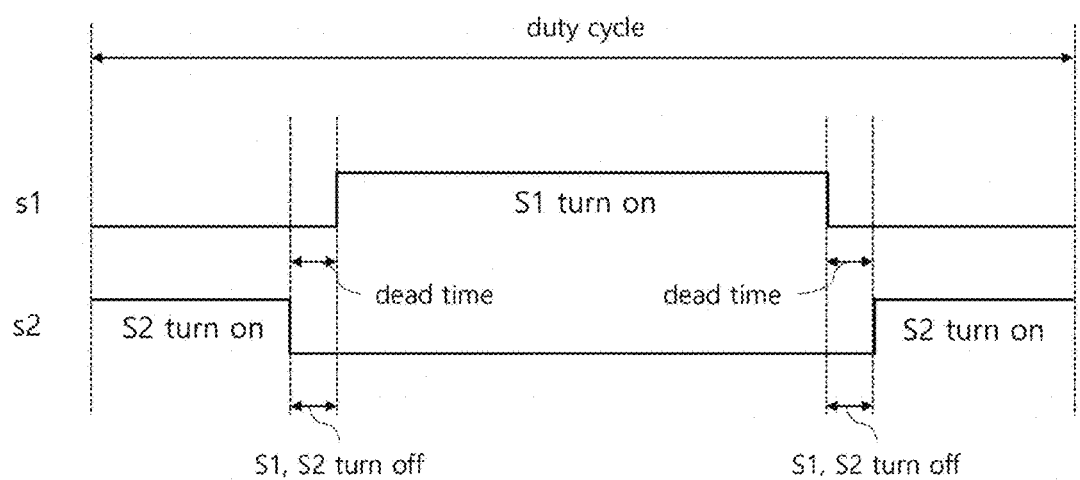
FIG. 5 is a diagram for describing a dead time according to an exemplary embodiment of the present disclosure.

FIG. 5 shows logic levels of two switching signals s1 and s2 for respectively switching two switches (S1 and S2 in FIG. 1) included in the first leg (L1 in FIG. 1) during one duty cycle. After a dead time has elapsed at a point in time when the switch S2 is switched from a turn-on state to a turn-off state by the switching signal s2, the switch S1 is turned on by the switching signal s1. Furthermore, after a dead time has elapsed at a point in time when the switch S1 is switched from a turn-on state to a turn-off state by the switching signal s1, the switch S2 is turned on by the switching signal s2.

During a dead time, since all switches that are switched in a complementary manner are turned off, an error occurs between a voltage command for the inverter and an output voltage of the inverter. Accordingly, the dead time compensator 105 needs to apply a voltage to compensate for the error generated during the dead time to the second space vector modulation signals svm2_a, b, and c in advance.

FIG. 6 shows a compensation voltage Vdt_comp according to a dead time. The dead time compensator 105 may be configured to determine a maximum voltage Vmax3_ref, a mid-voltage Vmid3_ref, and a minimum voltage Vmin3_ref of the third space vector modulation signals svm3_a, b, and c by applying the compensation voltage Vdt_comp according to a dead time to the maximum voltage Vmax2_ref, the mid-voltage Vmid2_ref, and the minimum voltage Vmin2_ref of the second space vector modulation signals svm2_a, b, and c.

Referring back to FIG. 3, the non-linear range detector 109 may activate the detection signal det when at least one of the maximum voltage and the minimum voltage of the plurality of third space vector modulation signals svm3_a, b, and c is not included in a preset linearity range. Alternatively, the non-linear range detector 109 may deactivate the detection signal det when the maximum voltage and the minimum voltage of the third space vector modulation signals svm3_a, b, and c are included in the preset linearity range.

The discontinuous modulator 111 may be configured to generate a plurality of pole voltage commands Vg_a, b, and c from the third space vector modulation signals svm3_a, b, and c corresponding to the plurality of phases based on the detection signal det.

When the detection signal det is deactivated (i.e., in case of a linear region), the discontinuous modulator 111 may output the third space vector modulation signals svm3_a, b, and c as the pole voltage commands Vg_a, b, and c without applying the offset voltage V_offset thereto.

On the other hand, if the detection signal det is activated (i.e., in case of a non-linear region), the discontinuous modulator 111 may apply the offset voltage V_offset for discontinuous modulation to the third space vector modulation signals svm3_a, b, and c to generate a plurality of discontinuous modulation signals, adjust at least one of a maximum voltage and a minimum voltage of the plurality of discontinuous modulation signals, and output the discontinuous modulation signals as the plurality of pole voltage commands Vg_a, b, and c.

Discontinuous modulation includes 60° discontinuous modulation and 120° discontinuous modulation.

In 60° discontinuous modulation, the offset voltage V_offset may include a first offset voltage and a second offset voltage, the first offset voltage may be set to a difference between the voltage VH of the first DC link (d1 in FIG. 1) and the maximum voltage of the second space vector modulation signals svm2_a, b, and c, and the second offset voltage may be set to a difference between the voltage VL of the second DC link (d2 in FIG. 1) and the minimum voltage of the second space vector modulation signals svm2_a, b, and c.

In 60° discontinuous modulation, if the detection signal det is activated, the discontinuous modulator 111 may alternately apply the first offset voltage and the first offset voltage to the third space vector modulation signals svm3_a, b, and c at 60° phase intervals and output the same as pole voltage commands Vg_a, b, and c.

In 120° discontinuous modulation, the offset voltage V_offset may be set to the difference between the voltage VH of the first DC link (d1 in FIG. 1) and the maximum voltage of the second space vector modulation signal svm2_a, b, and c or set to the difference between the voltage VL of the second DC link (d2 in FIG. 1) and the minimum voltage of the second space vector modulation signals svm2_a, b, and c according to an exemplary embodiment of the present disclosure. In 120° discontinuous modulation, when the detection signal det is activated, the discontinuous modulator 111 may apply the offset voltage V_offset to the third space vector modulation signals svm3_a, b, and c at 120° phase intervals and output the same as pole voltage commands Vg_a, b, and c.

Figure 7:
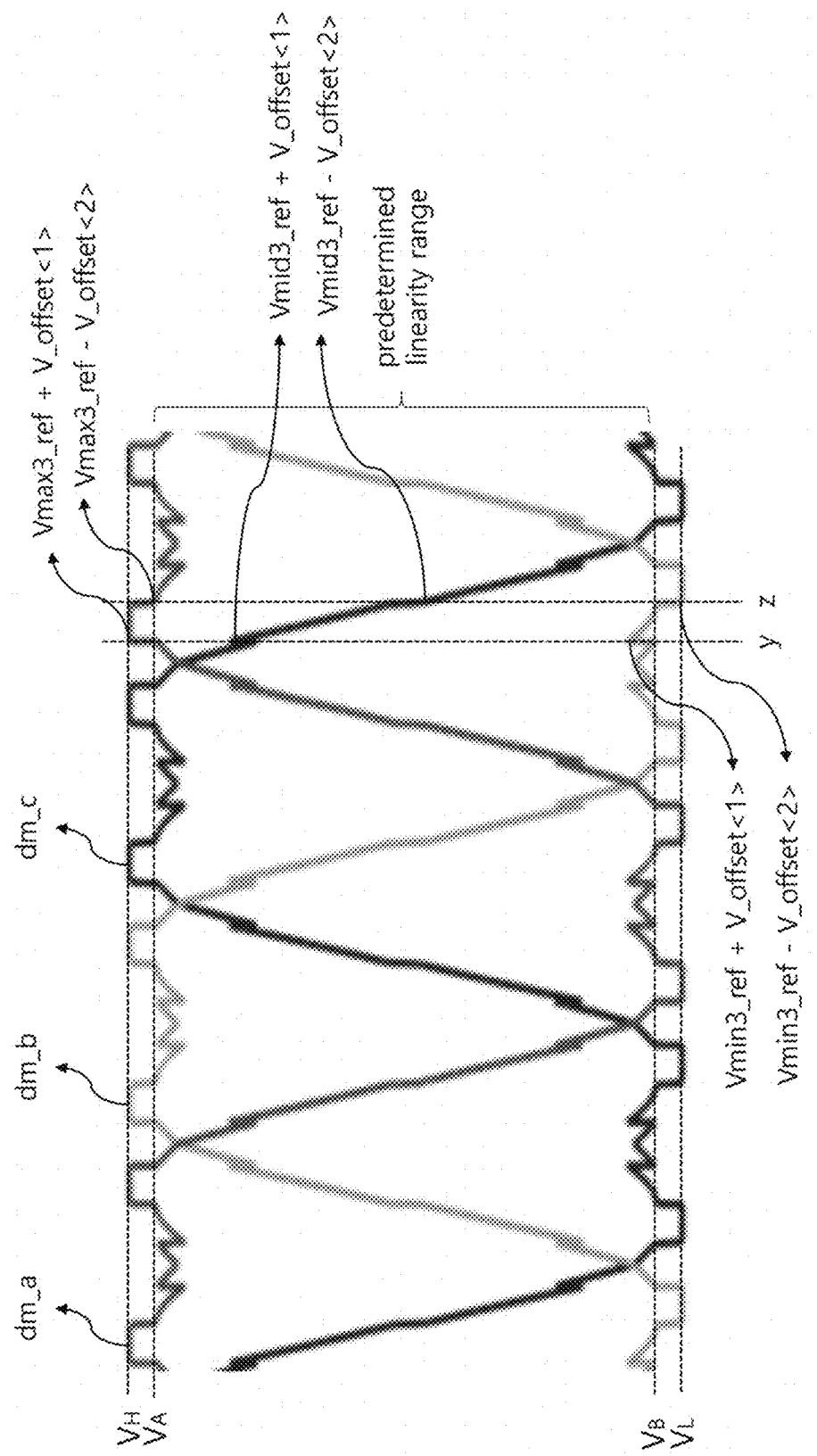
FIG. 7 is a waveform diagram of a discontinuous modulation signal to which an offset voltage for discontinuous modulation is applied according to an exemplary embodiment of the present disclosure.

FIG. 7 shows the waveforms of a plurality of discontinuous modulation signals dm_a, b, and c to which the offset voltage V_offset has been applied. At a predetermined point in time "y," the discontinuous modulator 111 may add the first offset voltage V_offset<1> to the maximum voltage Vmax3_ref, the mid-voltage Vmid3_ref, and the minimum voltage Vmin3_ref of the third space vector modulation signal svm3_a, b, and c. Here, the first offset voltage V_offset<1> may be set to the difference between the voltage VH of the first DC link (d1 in FIG. 1) and the maximum voltage of the second space vector modulation signals svm2_a, b, and c. Furthermore, at a predetermined point in time "z," the discontinuous modulator 111 may subtract the second offset voltage V_offset<2> from the maximum voltage Vmax3_ref, the mid-voltage Vmid3_ref, and the minimum voltage Vmin3_ref of the third space vector modulation signals svm3_a, b, and c. Here, the second offset voltage V_offset<2> may be set to the difference between the voltage VL of the second DC link (d2 in FIG. 1) and the minimum voltage of the second space vector modulation signals svm2_a, b, and c. As shown in FIG. 7, when at least one of the maximum voltage and the minimum voltage of the discontinuous modulation signals dm_a, b, and c is included in a preset linearity region, it is possible to improve linearity between a pole voltage command for the inverter and the output voltage of the inverter by applying the offset voltage V_offset. In FIG. 7, an example in which the first offset voltage V_offset<1> and the second offset voltage V_offset<2> are alternately applied to the voltages of the third space vector modulation signals svm3_a, b, and c at predetermined phase intervals has been described. However, the waveforms of the plurality of discontinuous modulation signals dm_a, b, and c in FIG. 7 are exemplary, and a phase interval at which the offset voltage V_offset is applied and the level of the offset voltage V_offset vary depending on embodiments.

Meanwhile, even if the discontinuous modulator 111 applies the offset voltage V_offset to the plurality of discontinuous modulation signals dm_a, b, and c, the maximum voltage of the plurality of discontinuous modulation signals dm_a, b, and c may exceed an upper limit voltage VA of a preset linearity range, or the minimum voltage of the plurality of discontinuous modulation signals dm_a, b, and c may be less than a lower limit voltage VB of the preset linearity range. In the instant case, pole voltage commands for the inverter and the output voltage of the inverter may have non-linearity.

Therefore, the discontinuous modulator 111 according to the exemplary embodiment may be configured to determine whether predetermined non-linear adjustment conditions are satisfied based on the maximum voltage and the minimum voltage of the plurality of discontinuous modulation signals, and when the non-linear adjustment conditions are satisfied, adjust at least one of the maximum voltage and the minimum voltage of the discontinuous modulation signals dm_a, b, and c and output the discontinuous modulation signals as pole voltage commands Vg_a, b, and c.

In an exemplary embodiment of the present disclosure, the non-linear adjustment conditions may be satisfied when the minimum voltage of the plurality of discontinuous modulation signals to which the first offset voltage V_offset<1> has been added is less than the lower limit voltage VB of the preset linearity range, or the maximum voltage of the plurality of discontinuous modulation signals from which the second offset voltage V_offset<2> has been subtracted exceeds the upper limit voltage VA of the preset linearity range.

Figure 8:
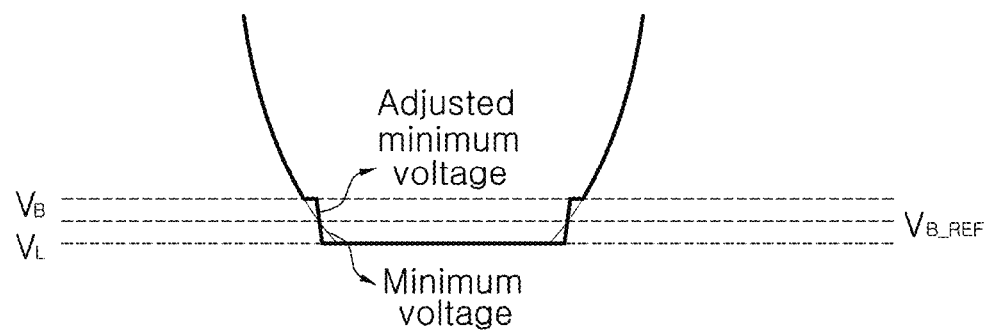
FIG. 8 and FIG. 9 are waveform diagrams for describing a process of adjusting voltages of a plurality of discontinuous modulation signals by a discontinuous modulator according to an exemplary embodiment of the present disclosure.

FIG. 8 is a waveform diagram for describing a process of adjusting the minimum voltage of the plurality of discontinuous modulation signals by the discontinuous modulator 111 when the minimum voltage of the plurality of discontinuous modulation signals to which the first offset voltage V_offset<1> has been added is less than the lower limit voltage VB of the preset linearity range. The discontinuous modulator 111 may adjust the minimum voltage of the plurality of discontinuous modulation signals to the lower limit voltage VB of the linearity range or the second DC link voltage VL based on a lower limit reference voltage VB_REF. When the minimum voltage of the plurality of discontinuous modulation signals is higher than the lower limit reference voltage VB_REF, the discontinuous modulator 111 may adjust the minimum voltage of the plurality of discontinuous modulation signals to the lower limit voltage VB of the preset linearity range. On the other hand, when the minimum voltage of the plurality of discontinuous modulation signals is lower than the lower limit reference voltage VB_REF, the discontinuous modulator 111 adjusts the minimum voltage of the plurality of discontinuous modulation signals to the second DC link voltage VL of the inverter. In the instant case, the lower limit reference voltage VB_REF may include a level between the lower limit voltage VB of the preset linearity range and the second DC link voltage VL. For example, the lower limit reference voltage VB_REF may be determined by Equation 1. In the instant case, "Vdc" may correspond to a DC voltage of a battery.

$$VB\_REF = -Vdc * 0.375 + VB * 0.25 \qquad \text{Equation 1}$$

Figure 9:
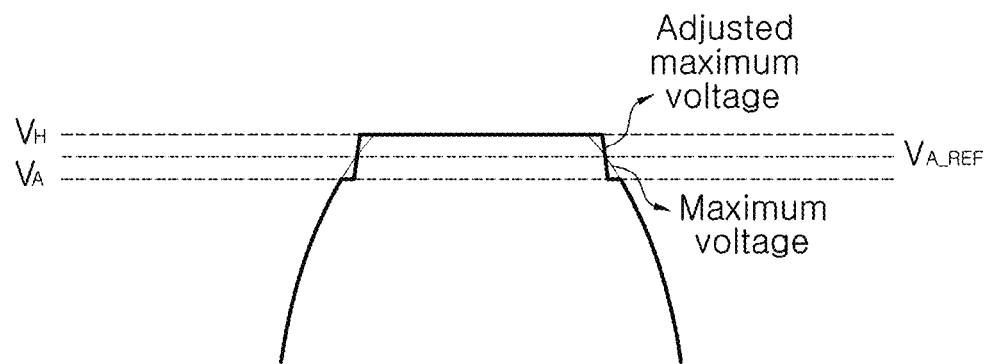

FIG. 9 is a waveform diagram for describing a process of adjusting the maximum voltage of the plurality of discontinuous modulation signals by the discontinuous modulator 111 when the maximum voltage of the plurality of discontinuous modulation signals from which the second offset voltage V_offset<2> has been subtracted exceeds the upper limit voltage VA of the preset linearity range. The discontinuous modulator 111 may adjust the maximum voltage of the plurality of discontinuous modulation signals to the upper limit voltage VA of the linearity range or the first DC link voltage VH based on an upper limit reference voltage VA_REF. When the maximum voltage of the plurality of discontinuous modulation signals is lower than the upper limit reference voltage VA_REF, the discontinuous modulator 111 may adjust the maximum voltage of the plurality of discontinuous modulation signals to the upper limit voltage VA of the preset linearity range. On the other hand, when the maximum voltage of the plurality of discontinuous modulation signals is higher than the upper limit reference voltage VA_REF, the discontinuous modulator 111 may adjust the maximum voltage of the plurality of discontinuous modulation signals to the first DC link voltage VH of the inverter. In the instant case, the upper limit reference voltage VA_REF may include a level between the upper limit voltage VA of the predetermined linearity range and the first DC link voltage VH. For example, the upper limit reference voltage VA_REF may be determined by Equation 2.

$$VA\_REF = Vdc * 0.375 + VA * 0.25 \qquad \text{Equation 2}$$

Accordingly, the discontinuous modulator 111 may adjust the maximum voltage and the minimum voltage of the plurality of discontinuous modulation signals and output the same as pole voltage commands Vg_a, b, and c when the preset non-linear adjustment conditions are satisfied, to improve linearity between the pole voltage commands for the inverter and the output voltage of the inverter.

Figure 10:
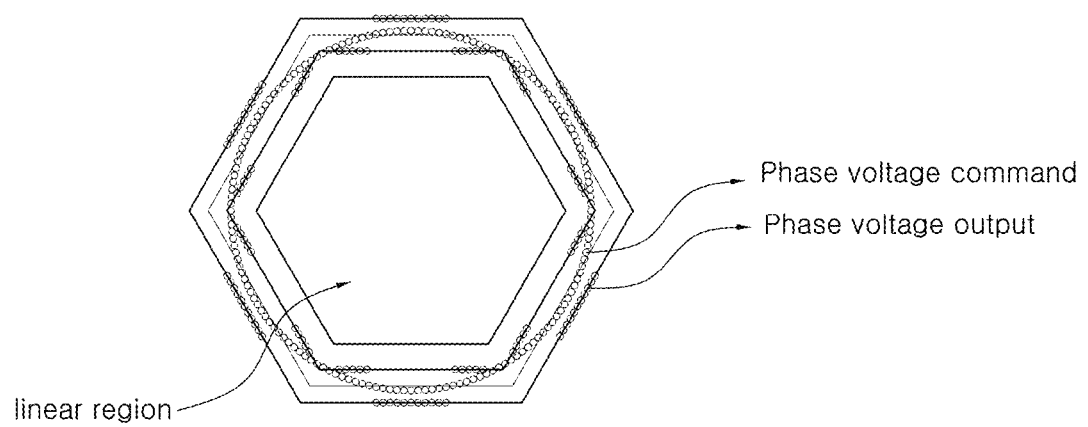
FIG. 10 shows a comparison between vector applied planes of phase voltage commands for an inverter and phase voltages output from the inverter when predetermined non-linear adjustment conditions are satisfied according to an exemplary embodiment of the present disclosure.

FIG. 10 shows a comparison between vector applied planes of phase voltage commands for an inverter and phase voltages output from the inverter when the predetermined non-linear adjustment conditions according to the exemplary embodiment are satisfied.

Referring back to FIG. 3, the pulse width modulator 113 may modulate the pole voltage commands Vg_a, b, and c using pulse width modulation and output the same as pulse width modulation signals pwm1 to pwm6.

The MPW controller 115 may be configured to determine whether or not to limit the pulse width of the pulse width modulation signals pwm1 to pwm6 according to MPW conditions and output the same as switching signals s1, s2, s3, s4, s5 and s6.

Figure 11:
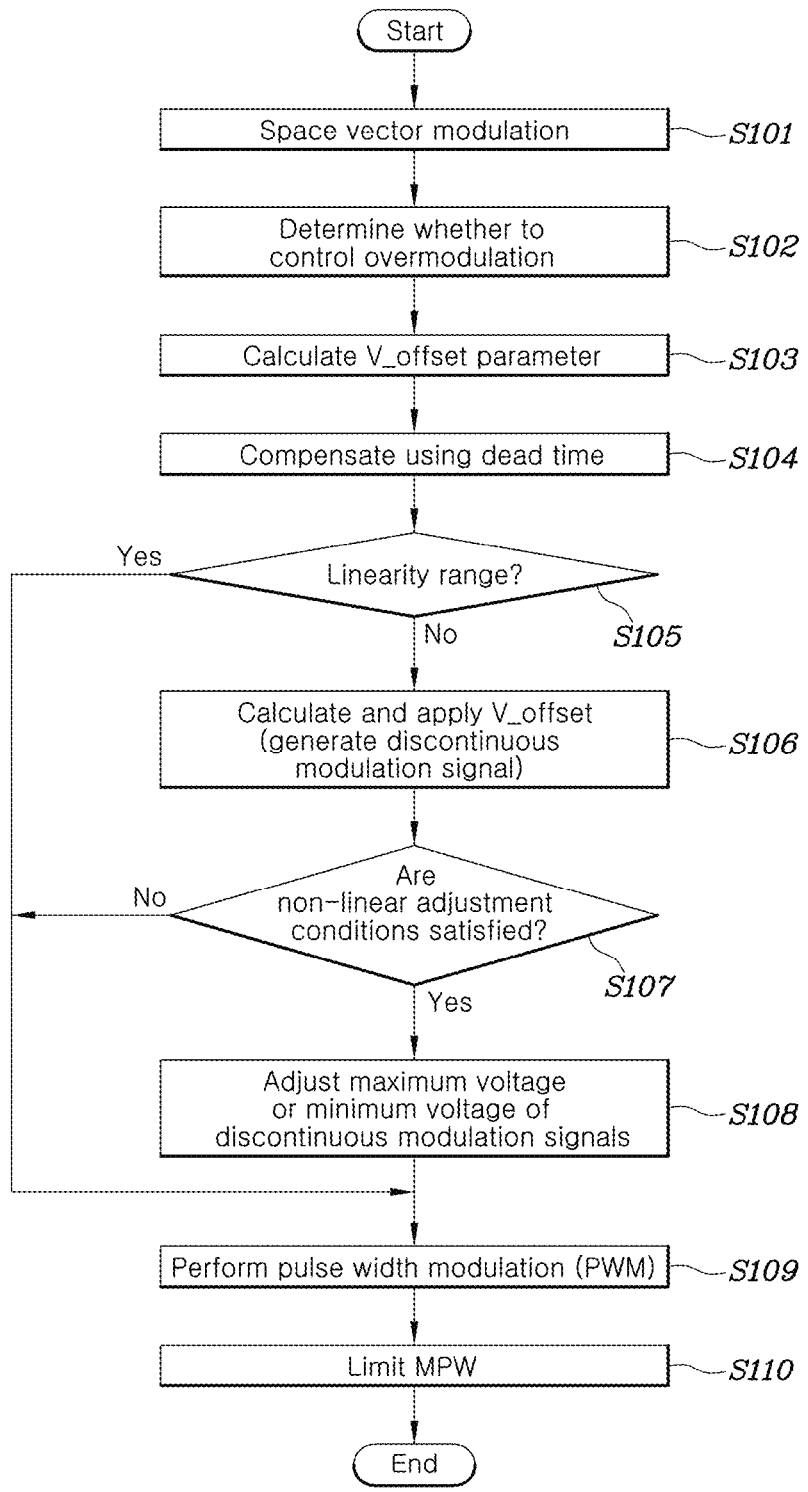
FIG. 11 is a flowchart for describing a method of controlling an inverter driving device according to an exemplary embodiment of the present disclosure.

FIG. 11 is a flowchart for describing a method of controlling the inverter driving device according to an exemplary embodiment of the present disclosure.

Referring to FIG. 11, the space vector modulator 101 may be configured to generate first space vector modulation signals svm1_a, b, and c corresponding to a plurality of phases through symmetric space vector modulation using a phase voltage command Vabc_s as a reference space vector (S101).

The overmodulation controller 103 may be configured to determine whether or not to control overmodulation for the first space vector modulation signals svm1_a, b, and c and output the first space vector modulation signals svm1_a, b, and c as second space vector modulation signals svm2_a, b, and c (S102), and the offset generator 105 may be configured to determine a maximum voltage and/or a minimum voltage for the second space vector modulation signals svm2_a, b, and c, which are parameters for setting the offset voltage V_offset, based on the second space vector modulation signals svm2_a, b, and c (S103).

The dead time compensator 107 may apply a compensation voltage according to a dead time to the second space vector modulation signals svm2_a, b, and c, and output the second space vector modulation signals svm2_a, b, and c as third space vector modulation signals svm3_a, b, and c (S104).

The non-linear range detector 109 may be configured to determine whether at least one of the maximum voltage and the minimum voltage of the third space vector modulation signal svm3_a, b, and c is included in a preset linearity range (S105), and the discontinuous modulator 111 may be configured to generate a plurality of pole voltage commands Vg_a, b, and c from the third space vector modulation signals svm3_a, b, and c corresponding to the plurality of phases based on the determination result in S105 (S106 to S108).

If at least one of the maximum voltage and the minimum voltage of the third space vector modulation signal svm3_a, b, and c is included in the linearity range (YES in S105), the discontinuous modulator 111 may output the third space vector modulation signal svm3_a, b, and c as the pole voltage commands Vg_a, b, and c without applying the offset voltage V_offset to the third space vector modulation signal svm3_a, b, and c. Thereafter, steps S109 and S110 may be sequentially performed.

If at least one of the maximum voltage and the minimum voltage of the third space vector modulation signal svm3_a, b, and c is not included in the linearity range (NO in S105), the offset generator 105 may be configured to determine an offset voltage V_offset for discontinuous modulation based on the parameters determined in S103. Thereafter, the discontinuous modulator 111 may be configured to generate a plurality of discontinuous modulation signals by applying the determined offset voltage V_offset to the third space vector modulation signals svm3_a, b, and c (S106).

Thereafter, the discontinuous modulator 111 may be configured to determine whether predetermined non-linear adjustment conditions are satisfied based on the maximum voltage and the minimum voltage of the plurality of discontinuous modulation signals (S107). As described above, the predetermined non-linear adjustment conditions may be satisfied if the minimum voltage of the plurality of discontinuous modulation signals to which the first offset voltage V_offset<1> has been added is less than the lower limit voltage VB of the preset linearity range, or the maximum voltage of the plurality of discontinuous modulation signals from which (V_offset<2>) has been subtracted exceeds the upper limit voltage VA of the preset linearity range.

If the predetermined non-linear adjustment conditions are satisfied (YES in S107), the discontinuous modulator 111 may adjust the maximum voltage and the minimum voltage of the plurality of discontinuous modulation signals and output the plurality of discontinuous modulation signals as the pole voltage commands Vg_a, b, and c (S108).

For example, if the minimum voltage of the plurality of discontinuous modulation signals to which the first offset voltage V_offset<1> has been added is less than the lower limit voltage VB of the preset linearity range, the discontinuous modulator 111 can adjust the minimum voltage of the plurality of discontinuous modulation signals. if the minimum voltage of the plurality of discontinuous modulation signals is higher than the lower limit reference voltage VB_REF, the discontinuous modulator 111 can adjust the minimum voltage of the plurality of discontinuous modulation signals to the lower limit voltage VB of the preset linearity range. On the other hand, if the minimum voltage of the plurality of discontinuous modulation signals is lower than the lower limit reference voltage VB_REF, the discontinuous modulator 111 can adjust the minimum voltage of the plurality of discontinuous modulation signals to the second DC link voltage VL of the inverter.

In addition, if the maximum voltage of the plurality of discontinuous modulation signals from which the second offset voltage V_offset<2> has been subtracted exceeds the upper limit voltage VA of the preset linearity range, the discontinuous modulator 111 can adjust the maximum voltage of the plurality of discontinuous modulation signals. If the maximum voltage of the plurality of discontinuous modulation signals is lower than the upper limit reference voltage VA_REF, the discontinuous modulator 111 can adjust the maximum voltage of the plurality of discontinuous modulation signals to the upper limit voltage VA of the preset linearity range. On the other hand, if the maximum voltage of the plurality of discontinuous modulation signals is higher than the upper limit reference voltage VA_REF, the discontinuous modulator 111 can adjust the maximum voltage of the plurality of discontinuous modulation signals to the first DC link voltage VH of the inverter.

If the predetermined non-linear adjustment conditions are not satisfied (NO in S107), the discontinuous modulator 111 may output the plurality of discontinuous modulation signals as the pole voltage commands Vg_a, b, and c without modifying the voltages of the plurality of discontinuous modulation signals. Thereafter, steps S109 and S110 may be sequentially performed.

Thereafter, the pulse width modulator 113 may modulate the pole voltage commands Vg_a, b, and c using PWM and output the same as pulse width modulation signals pwm1 to pwm6 (S109), and the MPW controller 115 may be configured to determine whether to limit the pulse width of the pulse width modulation signals pwm1 to pwm6 according to MPW conditions and output switching signals s1, s2, s3, s4, s5 and s6 for controlling a turn-on state of the switches S1, S2, S3, S4, S5 and S6 included in the inverter 20 (S110).

The present disclosure described above may be implemented as computer-readable code on a medium in which a program is recorded. Computer readable media include all kinds of recording devices in which data readable by a computer system is stored. Examples of computer-readable media include a Hard Disk Drive (HDD), a solid state drive (SSD), a silicon disk drive (SDD), a ROM, a RAM, a CD-ROM, a magnetic tape, a floppy disk, an optical data storage device, etc. Accordingly, the above detailed description should not be construed as restrictive in all respects but as exemplary. The scope of the present disclosure should be determined by a reasonable interpretation of the appended claims, and all modifications within the equivalent scope of the present disclosure are within the scope of the present disclosure.

According to an exemplary embodiment of the present disclosure, it is possible to alleviate distortion of a phase voltage output from an inverter and reduce noise generated at the time of driving a motor by improving linearity between a voltage command for the inverter and an output voltage of the inverter.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An inverter driving apparatus comprising:
    an inverter including a plurality of legs corresponding to a plurality of phases; and
    a controller configured to generate a plurality of pole voltage commands from a plurality of space vector modulation signals corresponding to each of the phases and to modulate the plurality of pole voltage commands through pulse width modulation to control a turn-on state of switches included in the plurality of legs, wherein the controller is configured to generate a plurality of discontinuous modulation signals by applying an offset voltage for discontinuous modulation to each of the space vector modulation signals in response that at least one of a maximum voltage and a minimum voltage of the plurality of space vector modulation signals is not included in a predetermined linearity range, to adjust at least one of a maximum voltage and a minimum voltage of the plurality of discontinuous modulation signals, and to output the adjusted discontinuous modulation signals as the plurality of pole voltage commands.

2. The inverter driving apparatus of claim 1, wherein the controller is further configured to output the plurality of space vector modulation signals as the plurality of pole voltage commands in response that the maximum voltage and the minimum voltage of the plurality of space vector modulation signals are included in the predetermined linearity range.

3. The inverter driving apparatus of claim 1, wherein the offset voltage includes:
    a first offset voltage set to a difference between a first DC link voltage of the inverter and the maximum voltage of the plurality of space vector modulation signals; and
    a second offset voltage set to a difference between a second DC link voltage of the inverter and the minimum voltage of the plurality of space vector modulation signals.

4. The inverter driving apparatus of claim 3, wherein the controller is further configured to adjust the minimum voltage of the plurality of discontinuous modulation signals in response that the minimum voltage of the plurality of discontinuous modulation signals to which the first offset voltage has been added is less than a lower limit voltage of the predetermined linearity range.

5. The inverter driving apparatus of claim 4, wherein the controller is further configured to adjust the minimum voltage of the plurality of discontinuous modulation signals to the lower limit voltage of the predetermined linearity range in response that the minimum voltage of the plurality of discontinuous modulation signals is higher than a lower limit reference voltage, and to adjust the minimum voltage of the plurality of discontinuous modulation signals to the second DC link voltage of the inverter in response that the minimum voltage of the plurality of discontinuous modulation signals is lower than the lower limit reference voltage,
    wherein the lower limit reference voltage includes a level between the lower limit voltage of the predetermined linearity range and the second DC link voltage.

6. The inverter driving apparatus of claim 3, wherein the controller is further configured to adjust the maximum voltage of the plurality of discontinuous modulation signals in response that the maximum voltage of the plurality of discontinuous modulation signals from which the second offset voltage has been subtracted exceeds an upper limit voltage of the predetermined linearity range.

7. The inverter driving apparatus of claim 6, wherein the controller is further configured to adjust the maximum voltage of the plurality of discontinuous modulation signals to the upper limit voltage of the predetermined linearity range in response that the maximum voltage of the plurality of discontinuous modulation signals is lower than an upper limit reference voltage, and to adjust the maximum voltage of the plurality of discontinuous modulation signals to the first DC link voltage of the inverter in response that the maximum voltage of the plurality of discontinuous modulation signals is higher than the upper limit reference voltage,
  wherein the upper limit reference voltage includes a level between the upper limit voltage of the predetermined linearity range and the first DC link voltage.

8. The inverter driving apparatus of claim 1, wherein the controller includes:
  a pulse width modulator configured to modulate the plurality of pole voltage commands through pulse width modulation to output a plurality of pulse width modulation signals; and
  an MPW controller configured to determine whether or not to limit pulse widths of the plurality of pulse width modulation signals according to minimum pulse width conditions and to output the pulse width modulation signals as switching signals for controlling the turn-on state of the switches.

9. A method of controlling an inverter driving apparatus, the method comprising:
  generating, by a controller, a plurality of pole voltage commands from a plurality of space vector modulation signals corresponding to each of a plurality of phases; and
  modulating, by the controller, the plurality of pole voltage commands through pulse width modulation to control a turn-on state of switches included in an inverter,
  wherein the generating of the plurality of pole voltage commands includes:
    generating a plurality of discontinuous modulation signals by applying an offset voltage for discontinuous modulation to each of the space vector modulation signals in response that at least one of a maximum voltage and a minimum voltage of the plurality of space vector modulation signals is not included in a predetermined linearity range;
    adjusting at least one of a maximum voltage and a minimum voltage of the plurality of discontinuous modulation signals; and
    outputting the adjusted discontinuous modulation signals as the plurality of pole voltage commands.

10. The method of claim 9, wherein the generating of the plurality of pole voltage commands includes outputting the plurality of space vector modulation signals as the plurality of pole voltage commands in response that the maximum voltage and the minimum voltage of the plurality of space vector modulation signals are included in the predetermined linearity range.

11. The method of claim 9, wherein the offset voltage includes:
  a first offset voltage set to a difference between a first DC link voltage of the inverter and the maximum voltage of the plurality of space vector modulation signals; and
  a second offset voltage set to a difference between a second DC link voltage of the inverter and the minimum voltage of the plurality of space vector modulation signals.

12. The method of claim 11, wherein the outputting of the plurality of pole voltage commands includes adjusting the minimum voltage of the plurality of discontinuous modulation signals in response that the minimum voltage of the plurality of discontinuous modulation signals to which the first offset voltage has been added is less than a lower limit voltage of the predetermined linearity range.

13. The method of claim 12, wherein the adjusting of the minimum voltage includes:
  adjusting the minimum voltage of the plurality of discontinuous modulation signals to the lower limit voltage of the predetermined linearity range in response that the minimum voltage of the plurality of discontinuous modulation signals is higher than a lower limit reference voltage; and
  adjusting the minimum voltage of the plurality of discontinuous modulation signals to the second DC link voltage of the inverter in response that the minimum voltage of the plurality of discontinuous modulation signals is lower than the lower limit reference voltage,
  wherein the lower limit reference voltage includes a level between the lower limit voltage of the predetermined linearity range and the second DC link voltage.

14. The method of claim 11, wherein the outputting as the plurality of pole voltage commands includes adjusting the maximum voltage of the plurality of discontinuous modulation signals in response that the maximum voltage of the plurality of discontinuous modulation signals from which the second offset voltage has been subtracted exceeds an upper limit voltage of the predetermined linearity range.

15. The method of claim 14, wherein the adjusting of the maximum voltage includes:
  adjusting the maximum voltage of the plurality of discontinuous modulation signals to the upper limit voltage of the predetermined linearity range in response that the maximum voltage of the plurality of discontinuous modulation signals is lower than an upper limit reference voltage; and
  adjusting the maximum voltage of the plurality of discontinuous modulation signals to the first DC link voltage of the inverter in response that the maximum voltage of the plurality of discontinuous modulation signals is higher than the upper limit reference voltage,
  wherein the upper limit reference voltage includes a level between the upper limit voltage of the predetermined linearity range and the first DC link voltage.

16. The method of claim 9, wherein the controlling includes:
  modulating the plurality of pole voltage commands through pulse width modulation to output a plurality of pulse width modulation signals; and
  determining whether or not to limit pulse widths of the plurality of pulse width modulation signals according to minimum pulse width conditions and outputting the pulse width modulation signals as switching signals for controlling the turn-on state of the switches.

17. A non-transitory computer readable storage medium on which a program for performing the method of claim 9 is recorded.

* * * * *